United States Patent Office 3,738,926
Patented June 12, 1973

3,738,926
METHOD AND APPARATUS FOR CONTROLLING THE ELECTRICAL PROPERTIES OF SPUTTERED FILMS
William Dickson Westwood and Robert James Boynton, Ottawa, Ontario, Canada, assignors to Bell Canada, Montreal, Quebec, Canada
Filed Mar. 28, 1972, Ser. No. 238,817
Int. Cl. C23c *15/00*
U.S. Cl. 204—192                           10 Claims

ABSTRACT OF THE DISCLOSURE

A method and apparatus for monitoring the sputtering of films by measuring the intensity of emission of two wavelengths in the light emitted by the plasma or glow discharge in the sputtering chamber. Two emission wavelengths are chosen which have a relationship which are indicative of sputtering conditions and are related to the particular electrical property of the film to be controlled. For example, the emission for nitrogen and argon are used for the control of the resistance of a tantalum film, the supply of nitrogen controlled to maintain a predetermined relationship between the emissions for nitrogen and argon.

---

This invention relates to the control of the electrical properties of sputtered films.

In the production of sputtered films the electrical properties of the films vary with variations in the flow rate of reactive gases in the apparatus. The flow rate to obtain a particular value of a property does not necessarily remain constant during a production run, and usually also varies from one run to another. There are various reasons for these variations, for example residual gases in the system.

In conventional systems, the property of interest is measured after formation of the film, and then any variation necessary is made to bring the value of the property back to specification. Such control has a long time-delay and as a result the process yield is quite low.

The present invention provides a means of monitoring the conditions within the sputtering chamber during sputtering, enabling the conditions to be varied immediately when deposition of a film which departs from specification would occur. The monitoring can be continuous, to provide continuous control of the process, or monitoring can be predetermined occasions such as at initiation of the process and at various times during the process to set-up the desired conditions in the sputtering chamber and to maintain the conditions during the process.

The invention will be understood by the following description in conjunction with the accompanying diagrammatic drawings, in which.

Figure 1:
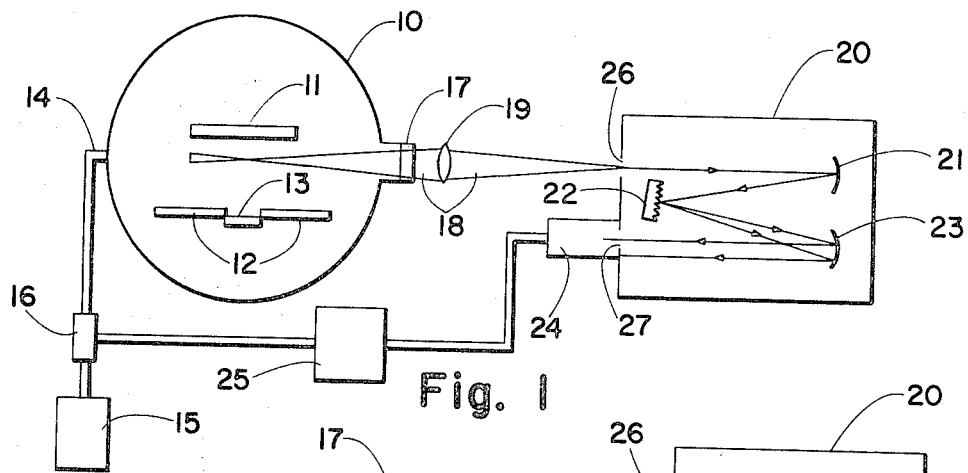
FIG. 1 illustrates a complete system using a single photomultiplier.

FIG. 1 illustrates one form of sputtering system, comprising a chamber 10 in which is mounted cathode 11 and anode 12. The substrate 13 onto which a layer is to be sputtered is mounted in an aperture in the anode 12. Gas, or a mixture of gases, is fed to the interior of the chamber 10 through pipe 14, from a supply 15 and the flow controlled by control valve 16. A window 17 permits emission of light rays from the plasma forming a glow discharge between anode and cathode. The sputtering chamber is of well known form and is not described in detail.

Light is emitted from the plasma, as indicated at 18, passes through lens 19, and then into a monochromator 20. The monochromator 20 shown is the grating type, the rays of light being reflected by a mirror 21 onto a grating 22 where the light ray is split up into the different wavelengths originating in the plasma. A further mirror 23 reflects the different rays to a photomultiplier 24. Outputs from the photomultiplier 24 are fed to a control circuit 25, the control circuit controlling the flow control valve 16.

The operation of the process, and apparatus, will be explained in relation to the production of a sputtered tantalum film on a substrate which can be a glass, a ceramic, or a crystal slice or wafer.

In sputtering tantalum films, the electrical properties of the film can be controlled by the addition of reactive gases, for example oxygen and nitrogen, to the glow discharge. For example the resistivity generally increases with increase of the flow rate of the reactive gas into the system. To obtain films of a predetermined resistivity the flow rate must be adjusted to obtain this required value.

Films can be produced by a batch process or by a continuous process. In a batch process, the flow rates to obtain a given electrical property—resistivity—may vary from batch to batch for various reasons, for example residual gases in the system and the output characteristics of the pump varying. The residual gases may also produce a continuous change in resistivity with deposition time. In a continuous in-line sputtering system the changes in property are detected by measurement of the film characteristics on substrates as they leave the sputtering chamber—changes being compensated by variation of the gas flow. However, there is a considerable time delay in such a system.

The present invention monitors the light emitted from the plasma, the light emitted focussed on the entrance slit of a monochromator having a resolution of a standard sufficient to separate the particular wavelengths of certain lines emitted by the atoms and molecules in the glow discharge, which wavelengths are preselected and used to obtain output signals.

Thus, taking the arrangement of FIG. 1, for sputtering a tantalum film on the substrate 13, an argon discharge is used. Nitrogen is added through the pipe 14. During sputtering, lines corresponding to tantalum, argon, nitrogen and hydrogen atoms are observed, as are also lines corresponding to nitrogen molecules. The light from the plasma is focussed on the entrance slit 26 of the monochromator 20 which separates the various wavelengths of the lines emitted in the discharge. The intensity of any one or more of these lines is measured by the photomultiplier 24 at the exit slit 27 of the monochromator 20. If the intensity of only one line is to be measured then the photomultiplier accepts just that line. For two lines the photomultiplier is arranged to measure the two lines in sequence. As will be explained alternative arrangements are possible.

For a tantalum film the emissions corresponding to nitrogen and argon are used in the present example. For a given position in the discharge (e.g. 1.5 cm. from the cathode surface) the emissions from nitrogen atoms and molecules increase with increase in nitrogen inlet rate; the tantalum emission also increases but the argon emission decreases. The absolute values of intensities are a function of sputtering time, but ratios of intensities are independent of time. Thus the ratio of intensity of emissions from nitrogen atoms or molecules to the intensity of emissions from argon atom or ion is independent of time and dependent on the nitrogen flow.

Figure 7:
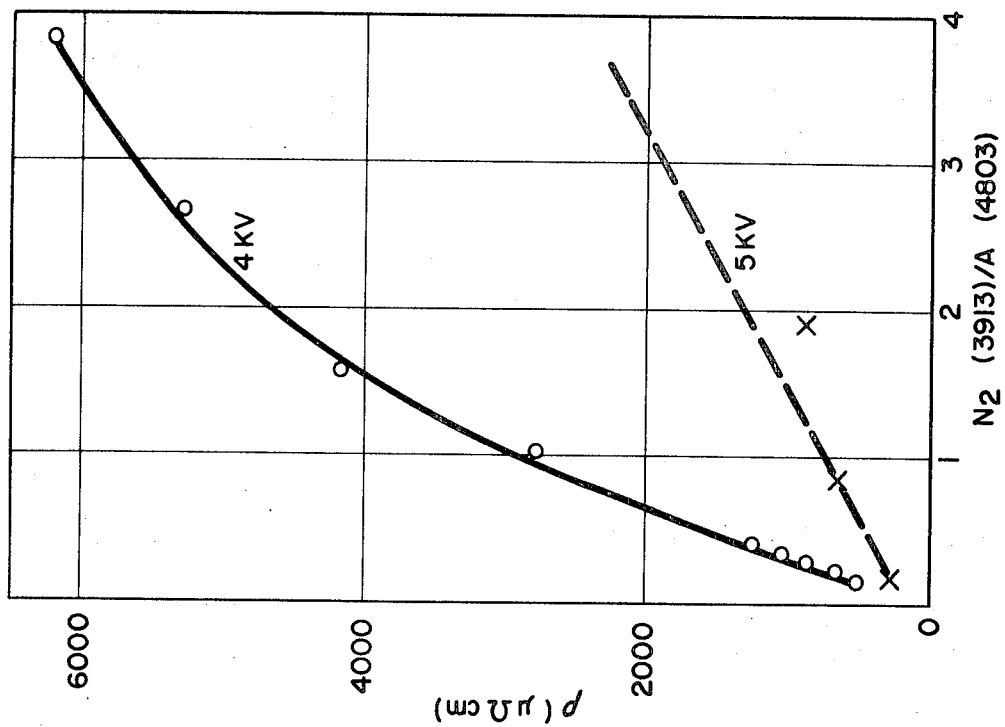
FIGS. 6 and 7 are curves showing change in resistance of a sputtered film for variations in the ratio of emissions from the discharge in the sputtering chamber.
Figure 6:
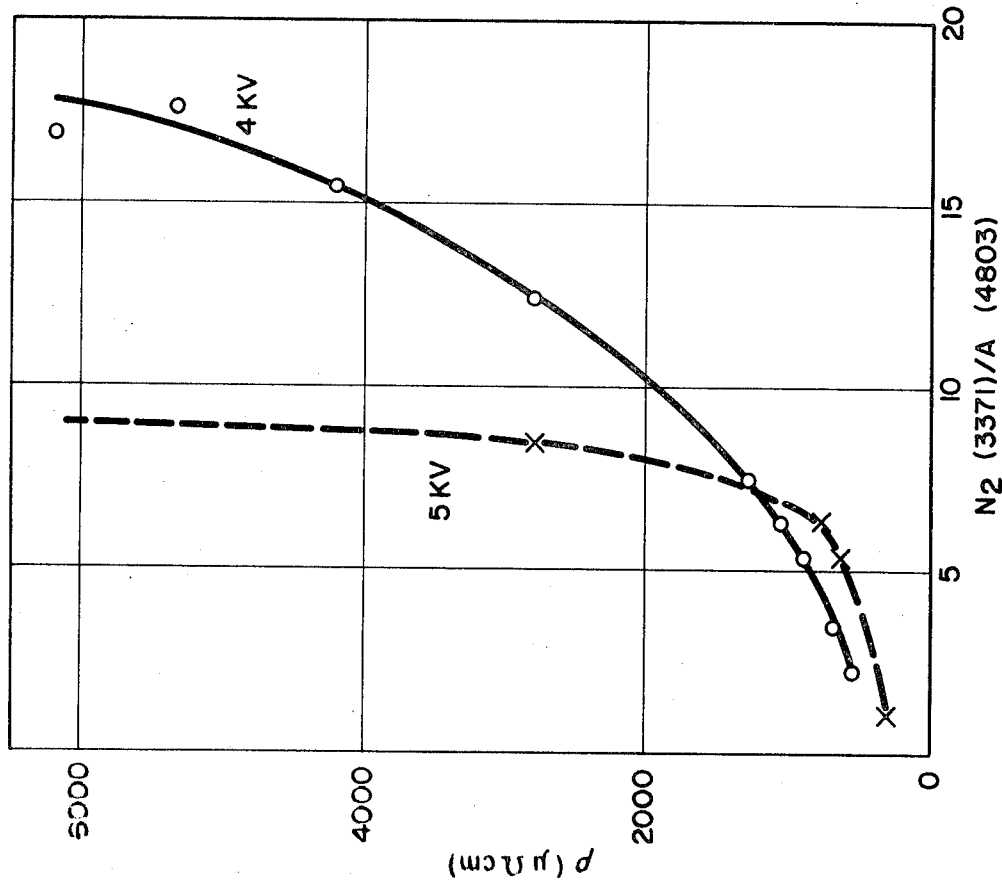

This relationship between the intensities of emission is made use of in the present invention. FIGS. 6 and 7 show the variations in resistivity of a tantalum film with variations in the ratio of intensity of emissions for nitrogen and argon. Each figures has two curves, one for a 4 kv. discharge and the other for a 5 kv. discharge. FIG. 6 relates to nitrogen emission at 3371A and argon emission at 4803A, while FIG. 7 relates to nitrogen at 3913A and argon at 4803A. The resistivity of the film increases with increases in the value $I(N_2)/I(A)$. The shapes of the curves in FIG. 6 differ from those in FIG. 7 because of differences in excitation of the lines of emission. For the same line the differences in reistivity of 41 kv. and 5 kv. discharges are due to changes in porosity. The shapes of the curves also depend upon the position of the sampled volume of plasma. For a given position, line and voltage there is a unique relationship between resistivity and relative intensity. This can be used to determine the resistivity of the film to be deposited before actually starting the deposition.

Figure 5:
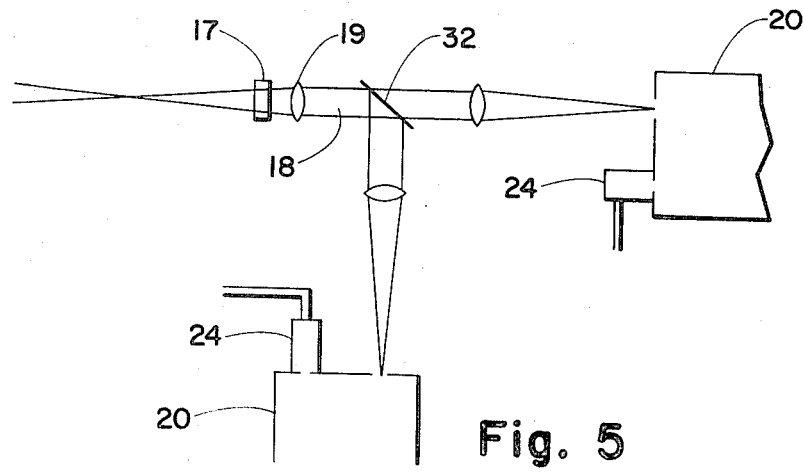

To deposit films of a required resistivity in a batch-type D.C. diode sputtering system the curves of FIGS. 5 and 6 are used by selecting the ratio $I(N_2)/I(A)$ as necessary and adjusting the nitrogen flow rate until this ratio is obtained. For example, to sputter films with a resistivity of $600\mu\Omega$ cm. from FIG. 6 as a value of 5.4 for the $I(N_2)/I(A)$ ratio is necessary when using the 3371A line and a 4 kva. discharge. The nitrogen flow rate was adjusted to maintain this value before discharge started, the value being obtained by means of the monochromator and photomultiplier. The output from the photomultiplier can be fed via the control circuit 25 to the valve 16 to maintain the ratio value at the desired level. On repeated runs films had the desired resistivity of $600\mu\Omega$ cm., although the nitrogen flow rate varied by $\pm 25\%$. Without the optical system, that is the monochromator and photomultiplier, to provide an indication of variations in the discharge conditions the sputtered films would have had resistivities which varied from 300 to $900\mu\Omega$ cm.

In a continuous system the flow rate would be adjusted initially to obtain the desired discharge conditions as evidenced by obtaining the desired ratio for $I(N_2)/I(A)$ and then any departure from the desired discharge conditions would be rectified by the output from the photomultiplier 24 to the control circuit 25.

Although the example so far described, with respect particularly to FIGS. 6 and 7, has assumed a monochromator having a fairly high standard of resolution, it is possible to use monochromators having a relatively low standard of resolution.

The standard of resolution of the monochromator need not be particularly high. While a high standard of resolution can be used, so that a reading is obtained corresponding to narrow band at the peak transmission of the line selected, it is also possible to use a lower standard of resolution so that the signal will correspond to a wider band extending one or both sides of the peak selected. Some degree of precision in control may be lost but is still normally well within the variation satisfactory for producing acceptable films.

Figure 2:
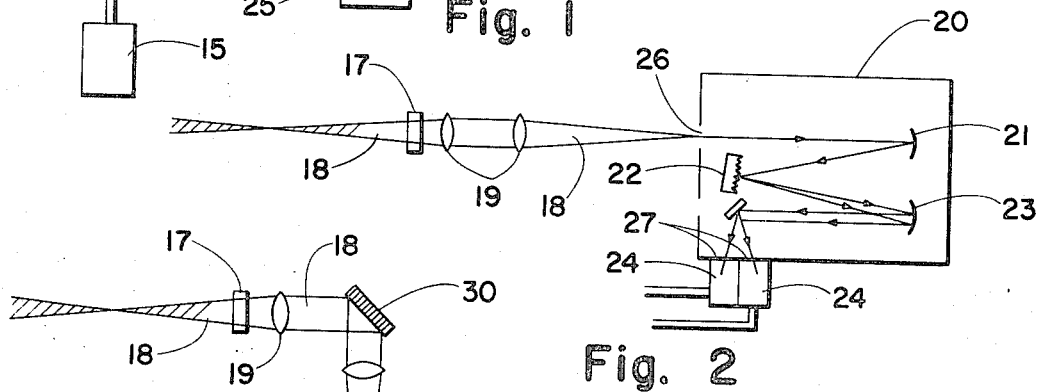
FIG. 2 illustrates a modification of FIG. 1, using two photomultipliers.

FIG. 2 illustrates a modification of the arrangement of FIG. 1, in which two photomultipliers 24 are used. By using two photomultipliers the intensity of each of the line of the two selected gases can be measured simultaneously. The outputs of the photomultipliers are fed to the control circuit 25.

Figure 3:
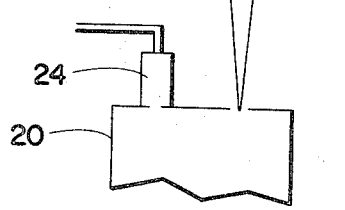
FIGS. 3, 4 and 5 illustrate alternative optical systems.
Figure 4:
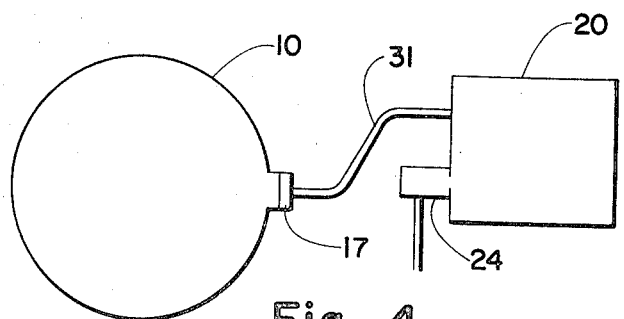

FIGS. 3, 4 and 5 illustrate further modifications. FIG. 3 merely shows an alternative positioning of this monochromator, the light rays 18 being reflected through a right-angle by mirror 30. In FIG. 4 the light rays from the sputtering chamber 10 are conducted through a fibre-optic "pipe" 31. FIG. 5 illustrates an arrangement in which the beam of light from the sputtering chamber 10 is split by a beam splitter 32, the beams being focused on the inlets of two monochromators 20.

Thus it will be seen that the present invention provides for the initial preparation and maintenance of the necessary conditions in a sputtering chamber for batch-type production, and for the continuous monitoring, and control, of the conditions for continuous process sputtering. Variations in the conditions within the sputtering chamber, resulting for example from variations in flow rate of the reactive gas, or from variations in residual gas, or gases, in the chamber, are detected and indicated, and can be rapidly countered, to maintain the desired conditions.

The particular emissions used can be varied, it being only necessary to use those which have a relationship which is representative of the conditions within the sputtering chamber and which have variations in intensity of emission which can be related to the electric property which is to be maintained within specification tolerances.

The example described specifically is for tantalum sputtering, with nitrogen as the reactive gas and with an argon atmosphere, the property being resistivity. Other reactive gases and other atmospheres may be used for other processes, and the property to be controlled may also vary.

A grating system monochromator has been described in the example but other ways of line separation or selection can be used, for example, prism monochromators, interference filters and interferometers. Similarly, while photomultipliers have been described other forms of photodetectors can be used.

What is claimed is:

1. A method of controlling an electrical property of a sputtered film, comprising: passing light emitted from the glow discharge in the sputtering chamber to a wavelength selector; separating the various lines of differing wavelengths emitted from the discharge; measuring the intensity of two of the lines the ratio of the intensities of which are related to the property to be controlled; and varying the flow of a reactive gas to the chamber to maintain said ratio at a predetermined value.

2. A method as claimed in claim 1, one of the lines corresponding to the reactive gas.

3. A method as claimed in claim 1, one of the lines corresponding to the atmospheric gas.

4. A method as claimed in claim 1, including measuring the intensity of the lines with at least one photodetector, and feeding the output from the photodetector to a control circuit for control of the rate of flow of the reactive gas.

5. A method as claimed in claim 4, for a batch-type, process, including adjusting the flow of reactive gas to obtain said ratio prior to depositing the film.

6. A method as claimed in claim 4, for a continuous process, including adjusting the flow of reactive gas to obtain said ratio at the beginning of the process, and controlling the flow of reactive gas during the process to maintain said ratio of said predetermined value.

7. In a sputtering system apparatus for controlling an electrical property of a sputtered film, comprising: means for passing an emitted light beam from the glow discharge region of a sputtering chamber to a wavelength selector for separation into lines corresponding to gases in the said region; means for measuring the intensity of the lines of two of the gases, the lines having an intensity relationship related to said property; and means for controlling the flow of a reactive gas to the sputtering chamber to maintain said intensity relationship at a predetermined value.

8. Apparatus as claimed in claim 7, said wavelength selector comprising a monochromator and the means for measuring the intensity of the lines comprising at least one photomultiplier.

9. Apparatus as claimed in claim 8, including a control circuit, the output from the photomultiplier connected to said control circuit; and a valve for controlling the flow of reactive gas, the valve controlled by said control circuit.

10. Apparatus as claimed in claim 7, the means for measuring the intensity of said lines adapted to measure the lines corresponding to the reactive gas and the atmospheric gas in the sputtering chamber.

References Cited

UNITED STATES PATENTS

| | | | |
|---|---|---|---|
| 3,334,228 | 8/1967 | Mattson | 204—192 |
| 3,395,090 | 7/1968 | Meckel | 204—192 |
| 3,400,066 | 9/1968 | Caswell et al. | 204—192 |
| 3,480,535 | 11/1969 | Bloom | 204—192 |
| 3,654,109 | 4/1972 | Hohl et al. | 204—192 |
| 3,664,942 | 5/1972 | Havas et al. | 204—192 |

OTHER REFERENCES

Schalble et al., "Deposition Measurements In a Cathode Sputtering System," IBM Technical Disclosure Bulletin, vol. 6, No. 1, June 1963, pp. 112–113.

JOHN H. MACK, Primary Examiner

S. S. KANTER, Assistant Examiner

U.S. Cl. X.R.

118—7, 48; 117—93.3; 204—298